Patented June 11, 1935

2,004,864

UNITED STATES PATENT OFFICE 2,004,864

IMIDAZOLE DERIVATIVES, USEFUL ESPECIALLY AS TEXTILE ASSISTANTS AND PROCESS OF MAKING SAME

Charles Graenacher, Basel, and Franz Ackermann, Binningen, near Basel, Switzerland, assignors to the firm Society of Chemical Industry in Basle, Basel, Switzerland No Drawing. Application May 25, 1934, Serial No. 727,584. In Switzerland June 9, 1933

22 Claims. (Cl. 260—44)

By the present invention new imidazole derivatives which are very valuable as textile assistants are obtained by substituting by an alkyl or aralkyl radical the hydrogen atom of the NH-group of an imidazole which on the one hand is derived from a primary ortho-diamine and on the other hand is substituted at the $\mu$-carbon atom by an aliphatic or hydroaromatic radical containing at least 3 carbon atoms. The terms "alkyl-" and "aralkyl-radicals" as herein used are intended to include alkyl- and aralkyl-radicals substituted by hydroxyl, halogen, etc. Consequently the new products probably correspond to the general formula

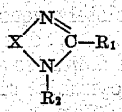

wherein X stands for an aromatic radical of the benzene or naphthalene series, wherein further the two N-atoms are bound to two carbon atoms in ortho-position, $R_1$ represents an aliphatic or hydroaromatic radical containing at least 3 carbon atoms, and $R_2$ an alkyl or aralkyl radical, the terms "alkyl" and "aralkyl radical" as herein used being intended to include substituted alkyl or aralkyl radicals, as already mentioned above. Among these products those are particularly valuable wherein the radical $R_1$ means an aliphatic radical consisting of at least 8 carbon atoms, and $R_2$ an aliphatic radical containing 2 to 3 carbon atoms which may be substituted by one or more hydroxyl groups. Also mixtures of such products among one another may have very particularly valuable effects. With strong acids, particularly with hydrohalic acids, they form salts whose dilute solutions are very capillary active. Further, they possess also the property to combine with dyestuffs containing sulfogroups to compounds which are generally sparingly soluble.

The substitution of the hydrogen atom of the imino-group of an imidazole derivative of the kind above defined may be brought about by treating the parent imidine with an alkylating or aralkylating agent in such a manner that merely the imidine hydrogen is replaced. This is best carried out by treating imidazole derivatives of the formula

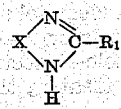

wherein X and $R_1$ have the meaning indicated above, with the alkylating agents which are quite generally capable of converting a secondary base, for instance dimethylamine, into a tertiary amino compound. Such agents are well known and may be esters of alkyl or aralkyl alcohols, such as, for example, methyl iodide, methyl bromide or methyl chloride, the corresponding ethyl, propyl, butyl, amyl and benzyl compounds and similar products, such as chloracetic acid esters or amides or chloromethyl-naphthalene or the like, further the corresponding esters of sulfuric acid, such as monoethyl and diethyl sulfate or methylsulfate; further also glycol anhydrides, such as ethylene oxide, propylene oxide, butylene oxide and the like. Finally they may be compounds which are simultaneously esters and oxides, such as epichlorhydrine. Particularly valuable are such alkylating agents which introduce alkyls containing 2 to 3 carbon atoms and, if necessary, one or more hydroxyl groups. Such alkylating agents are ethyl chloride, ethylene chlorohydrine, ethylene bromohydrine, $\alpha$-glycerine chlorohydrine, epichlorohydrine and the like. The interaction takes place by heating the components in the presence or absence of a diluent.

Or the alkyl- or aralkyl-radical can be introduced by synthesizing the imidazole from a parent material which already contains the substituted nitrogen atom. For example, a secondary amine of the general formula aryl-NHR, wherein R stands for alkyl or aralkyl and wherein the aryl radical contains an amino- or nitrogroup in ortho-position to the NHR-group, may be condensed with an aliphatic or hydroaromatic carboxylic acid which contains at least nine carbon atoms, or with an ester of such an acid, and then, if necessary after reduction of the nitro-group, ring closure is brought about in known manner, for example, by heating, to form an imidazole derivative. Depending on the residues with which they are substituted, the new imidazole derivatives are colorless crystalline powders or semi-solid masses, which in the form of their salts dissolve in water to solutions which foam.

The new imidazoles find application in the textile industry and also in all other industries in which it is desired to cause or influence, preferably in an acid medium, alterations of colloidal or dissolved or undissolved phases. They are also valuable intermediate products for the manufacture of sulfonic acids and quaternary ammonium compounds according to the process of application Serial No. 667,133.

The following examples illustrate the invention:—

Example 1

30 parts of $\mu$-heptadecyl-benzimidazole are heated with 15 parts of ethyl bromide at 125° C. in an autoclave for 15 hours. The excess of ethyl bromide is then distilled and the residue is washed with benzine and dried.

The N-ethyl-$\mu$-heptadecyl-benzimidazole hydrobromide is thus obtained in the form of a colorless crystalline powder which dissolves in acidified water to a clear solution which foams strongly.

In an analogous manner there are obtained the corresponding $\mu$-heptadecyl-benzimidazoles monoalkylated at the nitrogen atom by using methyl chloride, ethyl chloride or allyl bromide instead of ethyl bromide, whereby products having similar properties are obtained.

Example 2

17.8 parts of $\mu$-heptadecyl-benzimidazole are heated with 5 parts of butyl chloride for 12 hours at 160° C. in an autoclave. The melt so obtained solidifies on cooling to a crystalline mass which dissolves in hot acidified water to a solution which foams strongly.

Example 3

67.2 parts of a mixture of $\mu$-pentadecyl-and $\mu$-heptadecyl-benzimidazole, obtainable by heating commercial stearic acid with ortho-phenylenediamine, are melted and heated to 125° C. Then 25.2 parts of dimethyl sulfate are added gradually to the melt and the reaction mixture is heated until a test sample dissolves in acidified water to a clear solution. The reaction mass solidifies to a brittle product which can easily be powdered.

Example 4

67.2 parts of the mixture of $\mu$-pentadecyl and $\mu$-heptadecyl-benzimidazole referred to in Example 3 and 25.3 parts of benzyl chloride are stirred together at 145–150° C., whilst excluding air. The mixture is kept at this temperature for 10 hours, whereby a pale yellowish oil is obtained which solidifies at room temperature to an extremely tough, resinous mass. By recrystallization of the mass from chlorobenzene, there is obtained a mixture of the N-benzylated benzimidazole hydrochlorides in the form of a colorless crystalline powder which is soluble to some extent in hot water acidified with hydrochloric acid.

Example 5

310 parts of $\mu$-heptadecenyl-benzimidazole, obtained by heating ortho-phenylene diamine together with olive oil, are stirred at 120–125° C. with 96 parts of ethylene chlorhydrine, preferably in an atmosphere free of oxygen, until a test sample of the reaction mixture dissolves to a clear solution in water acidified with hydrochloric acid. The reaction product, which consists chiefly of the hydrochloride of N-hydroxyethyl-$\mu$-heptadecenyl-benzimidazole, is a viscous, brownish oil at ordinary temperature.

Example 6

336 parts of a mixture of benzimidazoles alkylated at the $\mu$-carbon atom by higher alkyl radicals, obtained by heating ortho-phenylenediamine with hydrogenated fish oil, are heated with 90 parts of ethylene chlorhydrine at 125–130° C. for 8 hours, air being excluded. There is obtained a brownish oil which solidifies on cooling to a soft mass which dissolves in acidified water to a clear solution which foams strongly.

Example 7

10 parts of $\mu$-heptadecyl-benzimidazole are heated with 2 parts of ethylene oxide at 200° C. for 10 hours in an autoclave. There is obtained a faintly brownish oil which solidifies at ordinary temperature to a solid, wax-like substance and dissolves to a clear solution in water to which has been added a small quantity of hydrochloric acid.

Example 8

1 part of $\mu$-heptadecyl-benzimidazole and 3 parts of ethylene oxide are heated together in an autoclave at 200° C. for 10 hours. There is thus obtained a brownish oil which is soluble in water to a clear solution which foams strongly.

Example 9

178 parts of $\mu$-heptadecyl-benzimidazole are heated to 120–125° C. whereupon there are added gradually, while stirring, 60 parts of $\alpha$-glycerinechlorhydrine. The reaction mixture is then heated gradually to 150° C. and maintained at this temperature until a test sample of the reaction mass dissolves to a completely clear solution in acidified water. The reaction product, which is oily at a raised temperature solidifies at room temperature to a mass which resembles ointment and is soluble also in organic solvents, such as alcohol, glycerine and benzene.

Example 10

31 parts of a benzimidazole, obtained by heating ortho-phenylenediamine with linseed oil, are heated at 155–160° C. for 8 hours with 9.6 parts of glycerine-chlorhydrine, air being excluded. There is obtained a product having properties similar to those of the reaction mass described in Example 8.

Example 11

10 parts of $\mu$-heptadecyl-4-amino-benzimidazole (made by condensation of para-nitrophenylenediamine with stearic acid and subsequent reduction of the condensation product) and 50 parts of ethylene-chlorhydrine are heated to boiling in a reflux apparatus until a test sample of the reaction mass dissolves readily in water to a clear solution. After the excess of ethylene-chlorhydrine has been distilled, there remains a brownish oily reaction product which forms solutions which foam strongly.

Example 12

17.8 parts of $\mu$-heptadecyl-benzimidazole are heated with 7 parts of monochloracetic acid ethyl ester at 130–140° C., with exclusion of air, until a test sample of the reaction mass dissolves in acidified water to a clear solution. After cooling, the mass solidifies to a crystalline cake of $\mu$-heptadecyl-benzimidazole-N-acetic-acid-ethyl ester hydrochloride. By treating the ester so obtained with a saponifying agent, such as an alcoholic caustic soda solution, there is obtained the sodium salt of $\mu$-heptadecyl-benzimidazole-N-acetic acid in the form of a colorless crystalline powder which dissolves readily in water to a solution which foams strongly. The product has excellent levelling properties.

*Example 13*

10 parts of the product of the action of $\alpha$-glycerine-chlorhydrine on $\mu$-heptadecyl-benzimidazole, the preparation of which is described in Example 9, and 10 parts of the product of the action of ethylene chlorhydrine on the mixture of benzimidazoles from hardened fish-oil and orthophenylenediamine, the preparation of which is described in Example 6, are melted together at 140° C. whilst excluding air. On cooling the mixture there is obtained a viscous semi-solid mass whose aqueous solutions are more stable than the aqueous solutions of the individual components.

*Example 14*

There are mixed together 100 parts of a mixture of benzimidazoles substituted at the $\mu$-carbon atom by higher alkyl-groups, obtainable by heating together ortho-phenylene-diamine and hydrogenated fish-oil, 50 parts of $\mu$-heptadecenyl-benzimidazole (prepared from ortho-phenylenediamine and olive oil) and 50 parts of a mixture of benzimidazoles consisting of the $\mu$-nonyl-, the $\mu$-undecyl-, the $\mu$-tridecyl-, the $\mu$-pentadecyl- and the $\mu$-heptadecenyl-benzimidazoles prepared by heating ortho-phenylenediamine and coconut oil. The mixture is heated for about 8 hours together with 60 parts of glycerine-chlorhydrine at 170–175° C., whilst excluding air. Heating is discontinued as soon as a sample of the reaction mixture dissolves to a clear solution in cold water. There is obtained a very viscous brownish oil which dissolves to completely clear solutions in water and in alcohol. Its aqueous solutions are stable, especially on the addition of some acid or of an alcohol.

*Example 15*

480 parts of hydrogenated fish-oil, 240 parts of olive oil, 239 parts of coconut oil and 363 parts of ortho-phenylenediamine are heated together at 220–240° C. whilst excluding air, until a sample of the reaction mass is found to be free from ortho-phenylenediamine; this requires about 18 hours. The reaction product is now allowed to cool to 120° C., whereupon there is allowed to run in gradually a mixture of 145 parts of ethylene chlorhydrine and 200 parts of $\alpha$-glycerine-chlorhydrine.

The reaction mixture is heated for some time at 120–125° C. with continuous slow stirring and with exclusion of air, after which the temperature is gradually raised to 165–170° C. Heating is discontinued as soon as a sample of the reaction mixture dissolves to a clear solution in water. There is thus obtained a tough brownish mass whose properties resemble those of the product described in Example 14. The process is similar with other diamines possessing adjacent NH$_2$-groups, such as, for example, toluylenediamine, 1,2- or 2,3-naphthylenediamine, 1,8-naphthylenediamine, and the like.

What we claim is:—

1. A process for the manufacture of imidazole derivatives, consisting in heating imidazole derivatives of the general formula

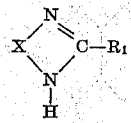

wherein X stands for an aromatic radical of the benzene or naphthalene series, wherein further the two N-atoms are bound to two carbon atoms in ortho-position, and R$_1$ represents an aliphatic radical containing at least 8 carbon atoms, with such alkylating agents which introduce alkyl radicals containing as substituents none but OH-groups.

2. A process for the manufacture of imidazole derivatives, consisting in heating imidazole derivatives of the general formula

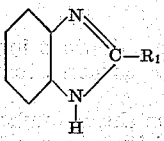

wherein R$_1$ represents an aliphatic radical containing at least 8 carbon atoms, with such alkylating agents which introduce alkyl radicals containing as substituents none but OH-groups.

3. A process for the manufacture of imidazole derivatives, consisting in heating imidazole derivatives of the general formula

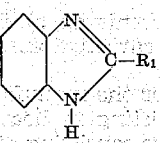

wherein R$_1$ represents an aliphatic radical containing at least 8 carbon atoms, with such alkylating agents which introduce alkyl radicals containing as substituents none but OH-groups.

4. A process for the manufacture of imidazole derivatives, consisting in heating imidazole derivatives of the general formula

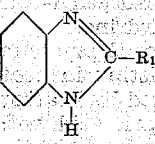

wherein R$_1$ represents an aliphatic radical containing at least 8 carbon atoms, with such alkylating agents which introduce alkyl radicals containing as substituents none but OH-groups and themselves contain not more than 3 carbon atoms.

5. A process for the manufacture of imidazole derivatives, consisting in heating imidazole derivatives of the general formula

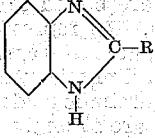

wherein R$_1$ represents an aliphatic radical containing at least 8 carbon atoms, with such alkylating agents which introduce alkyl radicals containing as substituents none but OH-groups and themselves contain not more than 3 carbon atoms and at least one hydroxyl-group.

6. A process for the manufacture of imidazole derivatives, consisting in heating imidazole derivatives of the general formula

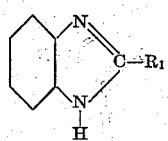

wherein $R_1$ represents an aliphatic radical containing at least 8 carbon atoms, with ethylene chlorohydrine.

7. A process for the manufacture of imidazole derivatives, consisting in heating imidazole derivatives of the general formula

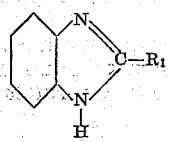

wherein $R_1$ represents an aliphatic radical containing at least 8 carbon atoms, with glycerine chlorohydrine.

8. A process for the manufacture of imidazole derivatives, consisting in heating imidazole derivatives of the general formula

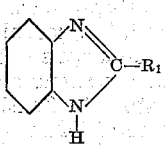

wherein $R_1$ represents an aliphatic radical containing at least 8 carbon atoms, with methyl chloride.

9. A process for the manufacture of imidazole derivatives, consisting in heating the imidazole derivative mixture consisting of the $\mu$-nonyl-, the $\mu$-undecyl-, the $\mu$-tridecyl-, the $\mu$-pentadecyl-, and the $\mu$-heptadecenyl-benzimidazoles, with ethylene chlorohydrine.

10. A process for the manufacture of imidazole derivatives, consisting in heating the imidazole derivative mixture consisting of the $\mu$-nonyl-, the $\mu$-undecyl-, the $\mu$-tridecyl-, the $\mu$-pentadecyl-, and the $\mu$-heptadecenyl-benzimidazoles, with glycerine chlorohydrine.

11. A process for the manufacture of imidazole derivatives, consisting in heating the imidazole derivative prepared by heating ortho-phenylenediamine with stearic acid, with methyl chloride.

12. The imidazole derivatives of the general formula

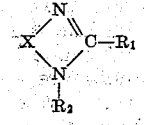

wherein X stands for an aromatic radical of the benzene or naphthalene series, wherein further the two N-atoms are bound to two carbon atoms in ortho-position, $R_1$ represents an aliphatic radical containing at least 3 carbon atoms, and $R_2$ an aliphatic or araliphatic radical, which products form with hydrohalic acids salts whose dilute aqueous solutions are strongly capillary active.

13. The imidazole derivatives of the general formula

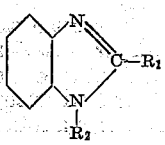

wherein $R_1$ represents an aliphatic radical containing at least 8 carbon atoms, and $R_2$ an aliphatic or araliphatic radical, which products form with hydrohalic acids salts whose dilute aqueous solutions are strongly capillary active.

14. The imidazole derivatives of the general formula

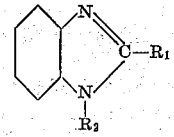

wherein $R_1$ represents an aliphatic radical containing at least 8 carbon atoms, and $R_2$ an aliphatic radical, which products form with hydrohalic acids salts whose dilute aqueous solutions are strongly capillary active.

15. The imidazole derivatives of the general formula

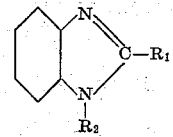

wherein $R_1$ represents an aliphatic radical containing at least 8 carbon atoms, and $R_2$ an aliphatic radical containing not more than 3 carbon atoms, which products form with hydrohalic acids salts whose dilute aqueous solutions are strongly capillary active.

16. The imidazole derivatives of the general formula

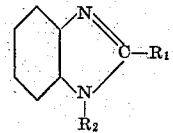

wherein $R_1$ represents an aliphatic radical containing at least 8 carbon atoms, and $R_2$ an aliphatic radical containing not more than 3 carbon atoms and at least one OH-group, which products form with hydrohalic acids salts whose dilute aqueous solutions are strongly capillary active.

17. The imidazole derivatives of the general formula

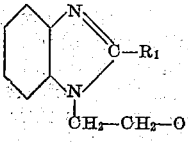

wherein $R_1$ represents an aliphatic radical containing at least 8 carbon atoms, which products form with hydrohalic acids salts whose dilute aqueous solutions are strongly capillary active.

18. The imidazole derivatives of the general formula

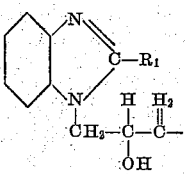

wherein $R_1$ represents an aliphatic radical containing at least 8 carbon atoms, which products form with hydrohalic acids salts whose dilute aqueous solutions are strongly capillary active.

19. The imidazole derivatives of the general formula

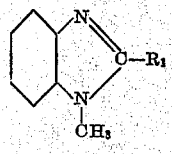

wherein $R_1$ represents an aliphatic radical containing at least 8 carbon atoms, which products form with hydrohalic acids salts whose dilute aqueous solutions are strongly capillary active.

20. The imidazole derivative mixture of the general formula

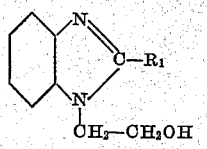

wherein $R_1$ represents the nonyl-, the undecyl-, the tridecyl-, the $\mu$-pentadecyl-, and the $\mu$-heptadecenyl-radical, which products form with hydrohalic acids salts whose dilute aqueous solutions are strongly capillary active.

21. The imidazole derivative mixture of the general formula

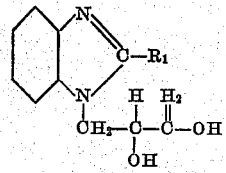

wherein $R_1$ represents the nonyl-, the undecyl-, the tridecyl-, the $\mu$-pentadecyl-, and the $\mu$-heptadecenyl-radical, which products form with hydrohalic acids salts whose dilute aqueous solutions are strongly capillary active.

22. The imidazole derivative of the formula

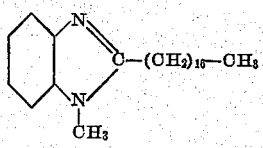

which product forms with hydrohalic acids salts whose dilute aqueous solutions are strongly capillary active.

CHARLES GRAENACHER.
FRANZ ACKERMANN.